(12) United States Patent
Chen (10) Patent No.: US 11,599,656 B2
(45) Date of Patent: *Mar. 7, 2023

(54) METHOD FOR AUTHORIZING FORM DATA OPERATION AUTHORITY

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/631,359

(22) PCT Filed: Jul. 13, 2018

(86) PCT No.: PCT/CN2018/095700
§ 371 (c)(1),
(2) Date: Jan. 15, 2020

(87) PCT Pub. No.: WO2019/015539
PCT Pub. Date: Jan. 24, 2019

(65) Prior Publication Data
US 2020/0218820 A1 Jul. 9, 2020

(30) Foreign Application Priority Data
Jul. 16, 2017 (CN) .......................... 201710578153.8

(51) Int. Cl.
*G06F 21/62* (2013.01)
*G06F 3/0482* (2013.01)
(Continued)

(52) U.S. Cl.
CPC ........ *G06F 21/6218* (2013.01); *G06F 3/0482* (2013.01); *G06F 21/31* (2013.01); *G06Q 10/105* (2013.01)

(58) Field of Classification Search
None
See application file for complete search history.

(56) References Cited

U.S. PATENT DOCUMENTS 5,838,812 A * 11/1998 Pare, Jr. ................ G06F 21/554
382/181
5,911,143 A * 6/1999 Deinhart ............... G06F 21/604
707/999.009
(Continued)

FOREIGN PATENT DOCUMENTS

CN 101075254 A 11/2007
CN 101673375 A 3/2010
(Continued)

OTHER PUBLICATIONS

K. Andrews, S. Steinau and M. Reichert, "Enabling Fine-Grained Access Control in Flexible Distributed Object-Aware Process Management Systems," 2017 IEEE 21st International Enterprise Distributed Object Computing Conference (EDOC), Quebec City, QC, Canada, 2017, pp. 143-152, doi: 10.1109/EDOC. (Year: 2017).*

(Continued)

*Primary Examiner* — William L Bashore
*Assistant Examiner* — Nathan K Shrewsbury
(74) *Attorney, Agent, or Firm* — Ladas & Parry, LLP (57) ABSTRACT

A method for authorizing operation permissions of form data is disclosed in the present invention, including a step of selecting form data, where one or more pieces of form data, operation permissions of which need to be authorized are selected; a step of selecting a grantee, where one or more grantees to which operation permissions need to be authorized are selected; and a step of authorizing operation (Continued)

permissions, where the operation permissions of the selected form data are authorized to the selected grantee. In the present application, one or more pieces of form data can be independently authorized respectively, for example, the operation permissions of the customer Haier Electronics can be authorized only, which improves the fineness of system management, and is especially applicable to the case where the operation permissions of an important customer's form data need to be set independently, thus helping to protect the enterprise's confidential form data from leakage and satisfying actual use requirements of the enterprise.

8 Claims, 4 Drawing Sheets

(51) Int. Cl.
G06F 21/31 (2013.01)
G06Q 10/105 (2023.01)

(56) References Cited

U.S. PATENT DOCUMENTS

| | | | | |
|---|---|---|---|---|
| 7,039,606 | B2* | 5/2006 | Hoffman | G06Q 50/188 705/28 |
| 7,703,021 | B1* | 4/2010 | Flam | G06F 21/6227 715/741 |
| 7,734,999 | B2* | 6/2010 | Leung | G06F 40/174 715/222 |
| 8,429,708 | B1* | 4/2013 | Tandon | G06F 21/604 713/153 |
| 10,681,095 | B1* | 6/2020 | Wang | H04L 67/1097 |
| 11,507,679 | B2* | 11/2022 | Chen | G06F 21/64 |
| 2001/0013947 | A1* | 8/2001 | Van Der Linden | G06F 3/1268 358/1.15 |
| 2001/0021928 | A1* | 9/2001 | Ludwig | G06Q 30/02 707/999.001 |
| 2002/0026592 | A1* | 2/2002 | Gavrila | G06F 21/6218 709/229 |
| 2002/0194219 | A1* | 12/2002 | Bradley | G06F 40/117 725/9 |
| 2004/0006594 | A1* | 1/2004 | Boyer | G06F 21/6218 709/204 |
| 2004/0205534 | A1* | 10/2004 | Koelle | G06Q 20/4012 705/72 |
| 2004/0230891 | A1* | 11/2004 | Pravetz | G06F 21/6218 715/255 |
| 2005/0027995 | A1* | 2/2005 | Menschik | G16H 40/67 713/193 |
| 2005/0060245 | A1* | 3/2005 | Hoffman | G06Q 30/04 705/28 |
| 2007/0011496 | A1* | 1/2007 | Ahmad | G06F 30/00 714/39 |
| 2007/0079384 | A1* | 4/2007 | Grinstein | H04L 67/02 726/27 |
| 2008/0127310 | A1* | 5/2008 | Robbins | H04L 63/10 726/4 |
| 2009/0025063 | A1* | 1/2009 | Thomas | G06F 21/6218 726/4 |
| 2009/0259578 | A1* | 10/2009 | Maw | G06Q 20/20 705/35 |
| 2009/0292546 | A1* | 11/2009 | Aleixo | G06Q 10/105 705/320 |
| 2010/0042680 | A1* | 2/2010 | Czyzewicz | H04L 61/4547 709/203 |
| 2010/0251092 | A1* | 9/2010 | Sun | G06F 40/174 715/221 |
| 2010/0306008 | A1* | 12/2010 | Grebenik | G06Q 10/10 705/7.13 |
| 2011/0162046 | A1* | 6/2011 | Forster | H04L 9/3271 726/4 |
| 2011/0246867 | A1* | 10/2011 | Tsutsumi | G06F 40/174 715/222 |
| 2011/0321154 | A1* | 12/2011 | Dau | G06F 21/6218 726/17 |
| 2012/0036263 | A1* | 2/2012 | Madden | G06F 21/6218 709/225 |
| 2012/0090037 | A1* | 4/2012 | Levit | G06F 21/629 726/28 |
| 2012/0323717 | A1* | 12/2012 | Kirsch | G06Q 20/3829 705/26.1 |
| 2013/0007851 | A1 | 1/2013 | Robbins et al. | |
| 2013/0013529 | A1* | 1/2013 | Chheda | G06Q 40/02 705/342 |
| 2013/0097478 | A1* | 4/2013 | Allison | G06Q 10/10 715/222 |
| 2013/0272523 | A1* | 10/2013 | McCorkindale | H04N 1/44 380/243 |
| 2013/0312084 | A1* | 11/2013 | Tandon | H04L 63/101 726/17 |
| 2014/0129268 | A1* | 5/2014 | B'Far | G06Q 10/063112 705/7.11 |
| 2015/0106736 | A1* | 4/2015 | Torman | G06F 16/907 715/745 |
| 2015/0233733 | A1* | 8/2015 | Parks, III | G06Q 10/10 340/870.02 |
| 2015/0371016 | A1* | 12/2015 | Nielsen | G06F 21/629 726/27 |
| 2016/0246992 | A1* | 8/2016 | Brutschy | G06F 21/6245 |
| 2016/0253512 | A1* | 9/2016 | Evers | G06F 21/6209 726/6 |
| 2018/0018448 | A1* | 1/2018 | Schulze | G16H 40/20 |
| 2018/0197624 | A1* | 7/2018 | Robaina | G16H 10/60 |
| 2019/0050587 | A1* | 2/2019 | Dang | G06F 21/6209 |
| 2020/0134527 | A1* | 4/2020 | Chen | G06F 21/6218 |
| 2020/0143068 | A1* | 5/2020 | Chen | G06Q 10/10 |
| 2020/0143077 | A1* | 5/2020 | Chen | G06F 3/0484 |
| 2020/0151670 | A1* | 5/2020 | Chen | G06Q 10/105 |
| 2020/0184091 | A1* | 6/2020 | Chen | G06F 21/62 |
| 2020/0202023 | A1* | 6/2020 | Chen | G06Q 10/10 |
| 2020/0202301 | A1* | 6/2020 | Chen | G06Q 10/105 |
| 2020/0218796 | A1* | 7/2020 | Chen | G06F 21/6227 |
| 2020/0219063 | A1* | 7/2020 | Chen | G06F 21/604 |
| 2020/0382512 | A1* | 12/2020 | Chen | G06Q 10/063112 |

FOREIGN PATENT DOCUMENTS

| | | |
|---|---|---|
| CN | 102841883 A | 12/2012 |
| CN | 102902767 A | 1/2013 |
| CN | 104715341 A | 6/2015 |
| CN | 106570406 A | 4/2017 |
| CN | 106599718 A | 4/2017 |
| CN | 107330307 A | 11/2017 |

OTHER PUBLICATIONS

Andrews, Kevin et al. "Towards Hyperscale Process Management." RADAR+EMISA@CAiSE (2017). (Year: 2017).*

International Search Report in the international application No. PCT/CN2018/095700, dated Sep. 30, 2018.

Written Opinion of the International Searching Authority in the international application No. PCT/CN2018/095700, dated Sep. 30, 2018 with English translation provided by Google Translate.

First Office Action and search report from CN app. No. 201810771765. 3, dated Feb. 3, 2021, with English translation from Global Dossier, all pages.

Second Office action and search report from CN app. No. 201810771765.3, dated Apr. 22, 2020, with English translation from Global Dossier, all pages.

Final Office Action from CN app. No. 201810771765.3, dated Jul. 5, 2021 with machine English translation from Google Translate, all pages.

Reexamination Decision from CN app. No. 201810771765.3, dated Nov. 22, 2021 with machine English translation from Google Translate, all pages.

Decision to Grant from CN app. No. 201810771765.3, dated Dec. 22, 2021 with English translation from Global Dossier, all pages.

(56) References Cited

OTHER PUBLICATIONS

Extended European Search Report from EP app. No. 18835429.4, dated Mar. 30, 2021, all pages.

* cited by examiner

| Sales department | Form selection | Industry to which the customer belongs | | | | | | |
|---|---|---|---|---|---|---|---|---|
| | | Customer industry | Add | View | Modify | Delete | Print | Export |
| ✓ Sales manager 1 (Zhang San) Salesperson 1 (Li Si) Salesperson 2 (Wang Wu) Salesperson 3 (Zhao Liu) ××× ××× | ✓ Customer Contract Order ××× ××× | Electrical appliance | ✓ | ✓ | ✓ | ✓ | ✓ | |
| | | Construction | ✓ | ✓ | ✓ | ✓ | ✓ | |
| | | Chemical | | | | | | |
| | | ××× ××× | | | | | | |

FIG. 5

| Grantee: workshop worker 1 (Zhang San), workshop worker 4 (Li Si), workshop worker 6 (Wang Wu) | | | | | | | |
|---|---|---|---|---|---|---|---|
| Form data name | Data type | View ☑ | Modify ☐ | Delete ☐ | Print ☐ | View related information ☐ | ××× |
| Haier Electronics | Customer | ✓ | ✓ | | ✓ | ✓ | |
| Deli Office Supply | Supplier | ✓ | ✓ | ✓ | ✓ | | |
| Vanke Real Estate sales contract | Contract | ✓ | | | | | |
| ××× ××× | ××× ××× | | | | | | |

FIG. 6

| Grantee: workshop worker 1 (Zhang San) Authorizer: workshop supervisor 1 (Zhao Liu) | | | | | |
|---|---|---|---|---|---|
| Form data name | Data type | View | Modify | Delete | Print |
| Haier Electronics | Customer | ✓ | ✓ | | |
| Deli Office Supply | Supplier | ✓ | ✓ | ✓ | ✓ |
| Vanke Real Estate sales contract | Contract | ✓ | | | |
| ××× ××× | ××× ××× | | | | |

FIG. 7

| Grantee: workshop worker 2 (Hu Qi) | | | | | |
|---|---|---|---|---|---|
| Authorizer: workshop supervisor 1 (Zhao Liu) | | | | | |
| Form data name | Data type | View | Modify | Delete | Print |
| Haier Electronics | Customer | ✓ | | | ✓ |
| Deli Office Supply | Supplier | ✓ | ✓ | | |
| Vanke Real Estate sales contract | Contract | ✓ | | | ✓ |
| ... ... | ... ... | | | | |

FIG. 8

| Grantee: workshop worker 1 (Zhang San), workshop worker 2 (Hu Qi) | | | | | |
|---|---|---|---|---|---|
| Authorizer: workshop supervisor 1 (Zhao Liu) | | | | | |
| Form data name | Data type | View | Modify | Delete | Print |
| Haier Electronics | Customer | ✓ | | | |
| Deli Office Supply | Supplier | ✓ | ✓ | | |
| Vanke Real Estate sales contract | Contract | ✓ | | | |
| ... ... | ... ... | | | | |

FIG. 9

| Grantee: workshop worker 1 (Zhang San), workshop worker 2 (Hu Qi) | | | | | | |
|---|---|---|---|---|---|---|
| Authorizer: workshop supervisor 1 (Zhao Liu) | | | | | | |
| Form data name | Grantee | Data type | View | Modify | Delete | Print |
| Haier Electronics | Workshop worker 1 (Zhang San) | Customer | ✓ | ✓ | | |
| Haier Electronics | Workshop worker 2 (Hu Qi) | Customer | ✓ | | | ✓ |
| Deli Office Supply | Workshop worker 1 (Zhang San) | Supplier | ✓ | ✓ | ✓ | ✓ |
| Deli Office Supply | Workshop worker 2 (Hu Qi) | Supplier | ✓ | ✓ | | |
| Vanke Real Estate sales contract | Workshop worker 1 (Zhang San) | Contract | ✓ | | | |
| Vanke Real Estate sales contract | Workshop worker 2 (Hu Qi) | Contract | ✓ | | | ✓ |
| ... ... | | | | | | |

FIG. 10

METHOD FOR AUTHORIZING FORM DATA OPERATION AUTHORITY

CROSS-REFERENCE TO RELATED APPLICATIONS

This application is the U.S. national phase of PCT/CN2018/095700 filed on Jul. 13, 2018, which claims priority to Chinese Application No. 201710578153.8 filed on Jul. 16, 2017, the disclosures of which are incorporated by reference herein in their entireties.

BACKGROUND

Technical Field

The present invention relates to a method for authorizing operation permissions of form data in management software such as ERP.

Related Art

An enterprise management system includes numerous types of forms, for example, customer forms, contract forms, and order forms, and different roles in the enterprise have different form operation permissions. In conventional enterprise management software, it is a basic authorization method to control the operation permissions of form data by means of forms. However, the method can only achieve authorizing a form as a whole, but cannot achieve authorizing specific operation permissions of a certain piece (one or more pieces) of form data. In the conventional form-authorizing method, the form data refers to the data belonging to a certain range of the form, and during authorization, it is unnecessary to determine whether a form field on the form has already gotten a field value; whether the form field has already gotten the field value or not is irrelevant to the authorization method.

For example, the conventional form-authorizing method can achieve authorizing Li Si to view (modify or delete) all customers of the electrical appliance industry (for example, there are 10000 customers in the electrical appliance industry, and one of the customers is Haier Electronics), and authorizing Wang Wu to view (modify or delete) all customers in the construction industry (for example, there are 5000 customers in the construction industry, and one of the customers is Haitian Construction). However, the conventional method for authorizing the operation permissions of form data by means of forms cannot achieve authorizing the operation permissions for Haier Electronics or Haitian Construction only, and has certain limitations during authorization.

The conventional form-authorizing method cannot achieve independent authorization for a specific piece (one or more pieces) of form data. Once permissions are assigned to a form according to a certain rule, all data conforming to the rule in the form is assigned with the permissions. The information security of the enterprise is worrying, and some confidential form data of the enterprise may be leaked, which causes risks to the enterprise.

In addition, role-based access control (RBAC) is one of the most researched and mature permission management mechanisms for databases in recent years. It is considered to be an ideal candidate to replace conventional mandatory access control (MAC) and discretionary access control (DAC). Conventional discretionary access control has high flexibility but low security. Mandatory access control is highly secure but too restrictive. Role-based access control combines both above, and not only is easy to manage, but also reduces complexity, costs, and probability of errors. Therefore, it has been greatly developed in recent years. The basic idea of role-based access control (RBAC) is to divide different roles according to different functional positions in the enterprise organization view, encapsulate the access permission of database resources in roles, and allow users to indirectly access database resources by assigning different roles to the users.

A large number of tables and views are often built in large-scale application systems, which makes the management and permissions of database resources very complicated. It is very difficult for a user to directly manage the access and permissions of the database resources. It requires the user to have a very thorough understanding of the database structure and to be familiar with the use of the SQL language. Once the application system structure or security requirements have changed, a large number of complex and cumbersome permission changes are required, and the security vulnerabilities caused by unexpected authorization errors are very likely to occur. Therefore, designing a simple and efficient permission management method for large-scale application systems has become a common requirement for systems and system users.

The role-based permission control mechanism can manage the access permissions of the system simply and efficiently, which greatly reduces the burden and cost of the permission management of the system, and makes the permission management of the system more compliant with the business management specifications of the application system.

Figure 1:
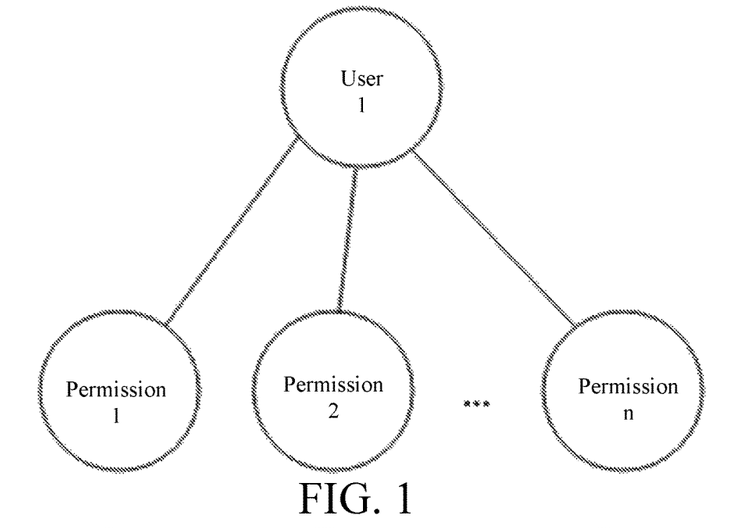
FIG. 1 is a schematic diagram in which a system directly authorizes a user in the prior art.

However, the conventional role-based user permission management method adopts the "role-to-user, one-to-many" relation mechanism, where the "role" has the nature of a group or class. That is, one role can simultaneously correspond to or be related to multiple users, and the role is similar to a post or a position or a type of work or other concepts. The permission authorized to a user under this relation mechanism is basically divided into the following three forms: 1. As shown in FIG. 1, the permission is directly authorized to the user, where the disadvantage is that the workload is large and the operation is frequent and cumbersome. When changes on the employee have occurred (such as transfer or resignation), all form operation permissions related to the employee shall be adjusted accordingly. Especially, for administrators in a company, many form permissions are involved. As the permission adjustment involves large workloads and is cumbersome, errors or omissions are likely to occur, affecting the normal operation of the enterprise and even causing unpredictable losses.

Figure 2:
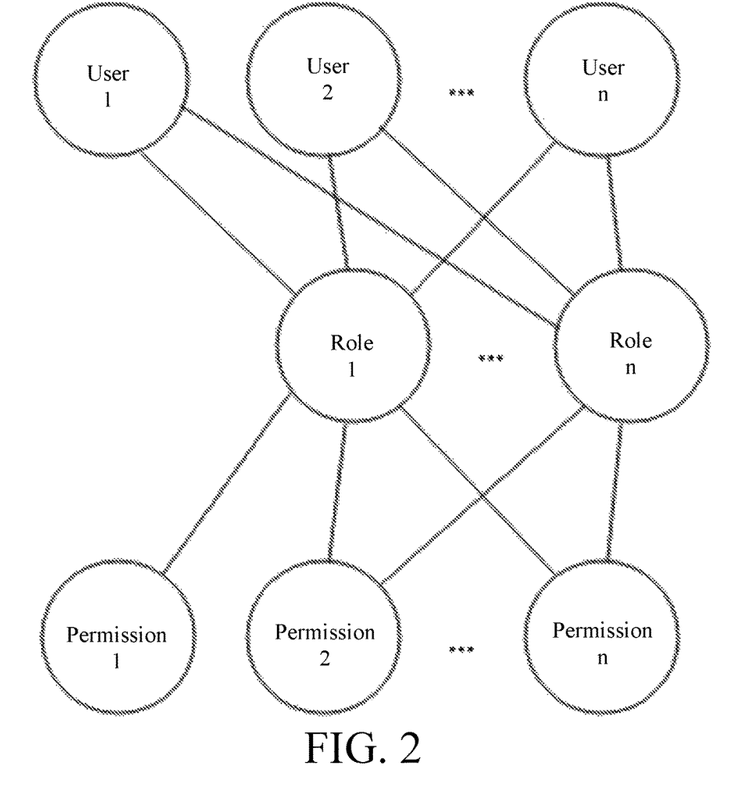
FIG. 2 is a schematic diagram in which a system authorizes a role having the nature of a group/a class in the prior art.
Figure 3:
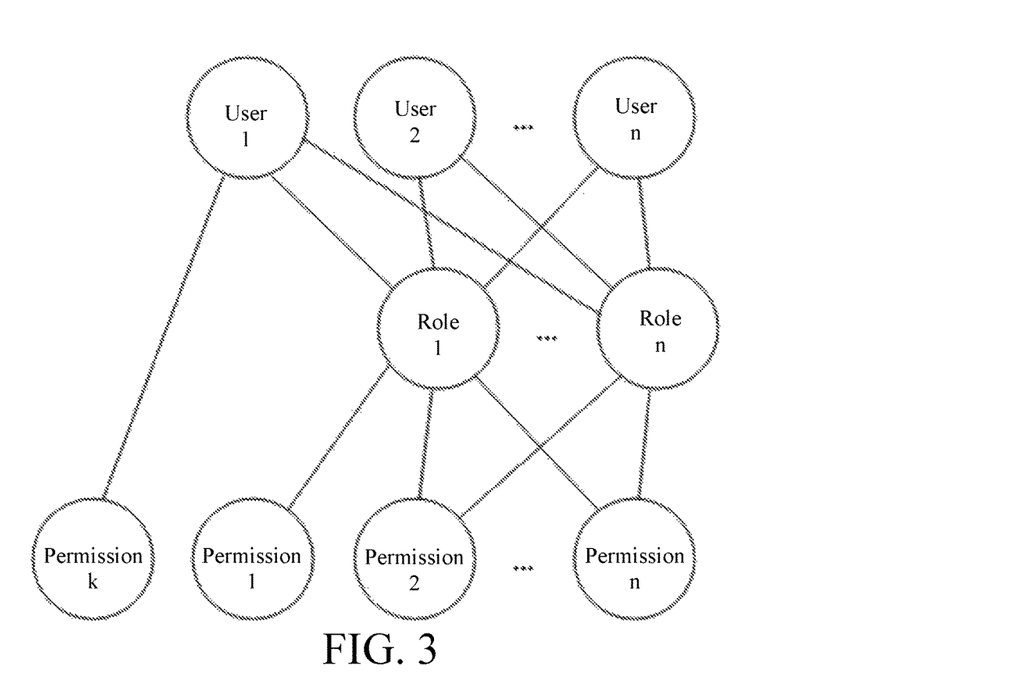
FIG. 3 is a schematic diagram in which a system both directly authorizes a user and a role having the nature of a group/a class in the prior art.

2. As shown in FIG. 2, the role (having the nature of a class/a group/a post/a type of work) is authorized (one role may be related to multiple users), the user obtains permissions through its role, and the approval operator is the role that has the nature of a group/a class. 3. As shown in FIG. 3, the above two methods are combined.

In the above descriptions, as both 2 and 3 need to authorize the role that has the nature of a class/a group. The way of authorization and workflow control through the role having the nature of a class/a group/a post/a type of work has the following disadvantages: 1. Operations are difficult when the user's permission has changed. In the actual process of using a system, the user's permissions often need to be adjusted during the operation process. For example, in processing the change of an employee's permissions, when the permissions of an employee related to the role have changed, it is improper to change the permissions of the entire role due to the change of the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

When the form operation permissions of the employee/user have changed, either the employee or the user is disengaged from the role, or a new role is added to meet the requirements of work. The defect of the first way is the same as that of the foregoing method of "direct authorization to the user". In the second way, adding a new role involves the creation, relation, and authorization of the role. Especially when there are many roles and many users related to the roles, it is difficult to remember which users are related to the role.

2. It is difficult to remember the specific permissions contained in a role for a long time. If the role has many permission function points, as time goes by, it is difficult to remember the specific permissions of the role, and it is even more difficult to remember the permission differences between roles with similar permissions. The permissions of similar roles are also easily confusable. If a new user needs to be related, it is impracticable to accurately determine how to select a relation.

3. Because user permissions change, more roles will be created (if new roles are not created, direct authorization to the user will be increased greatly), and it is more difficult to distinguish specific differences between permissions of the roles.

4. When a user is transferred from a post, if many permissions of the transferred user need to be assigned to other users, it is necessary to distinguish the permissions of the transferred user and create roles to be related to the other users respectively during the processing. Such operations are not only complicated and time-consuming, but also prone to errors.

SUMMARY

Technical Problems

The object of the present invention is to overcome the deficiencies of the prior art, and provide a method for authorizing operation permissions of form data, to achieve respective authorization for the operation permissions of specific form data and improve fineness of system management.

Solutions to Problems

Technical Solutions

The object of the present invention is achieved by the following technical solutions: A method for authorizing operation permissions of form data includes a step of selecting form data, a step of selecting a grantee, and a step of authorizing operation permissions, where there is no sequence relation between the step of selecting form data and the step of selecting a grantee; the step of selecting form data comprises selecting one or more pieces of form data, operation permissions of which need to be authorized; the step of selecting a grantee comprises selecting one or more grantees to which operation permissions need to be authorized; and the step of authorizing operation permissions comprises authorizing the operation permissions of the selected form data to the selected grantee.

The method further includes a step of respectively authorizing a permission to view and/or modify a field value of each form field of each piece of the selected form data.

Said step of authorizing operation permissions includes the following two authorization modes: (1) authorizing the operation permissions of each piece of the selected form data respectively; and (2) authorizing the operation permissions of all the selected form data as a whole.

Said operation permission includes one or a combination of more of a viewing permission, a modifying permission, a deleting permission, a printing permission, and a permission to view related information.

Said grantee includes one type or a combination of more types of a person, a user, a role having the nature of a group/a class, and a role having the nature of an independent individual.

Said grantee is a role having the nature of an independent individual, the role having the nature of an independent individual is different from the role having the nature of a group/a class, one role having the nature of an independent individual can only be related to a unique user during the same period, and one user is related to one or more roles having the nature of an independent individual.

Said role having the nature of an independent individual belongs to a certain department, the name of the role is unique under the department, the number of the role is unique in a system, the role is authorized according to the work content of the role, and the user obtains permissions through its related role.

A method for authorizing operation permissions of form data includes the following sequential steps: S1: selecting form data, where an authorizer selects one or more pieces of form data, operation permissions of which need to be authorized; S2: selecting a grantee, where the authorizer selects one or more grantees to which operation permissions need to be authorized, said grantee's operation permissions for the selected form data should be less than or equal to said authorizer's operation permissions for the selected form data; and S3: authorizing operation permissions, wherein the operation permissions of the selected form data are authorized to the selected grantee.

When one grantee is selected, the authorizer's all operation permission items for the selected form data are displayed, and at the same time, the current operation permission items of the selected grantee for the selected form data are selected from the authorizer's all operation permission items; and when multiple grantees are selected, the authorizer's all operation permission items for the selected form data are displayed, and at the same time, the selected grantees' current common operation permission items for the selected form data are selected from the authorizer's all operation permission items, or a list of the selected form data corresponding to each grantee is displayed and the current operation permission items of each grantee for each piece of the selected form data are selected.

A method for authorizing operation permissions of form data includes the following sequential steps: SS1: selecting a grantee, where an authorizer selects one or more grantees to which operation permissions need to be authorized; SS2: selecting form data, where the authorizer selects one or more pieces of form data, operation permissions of which need to be authorized, said grantee's operation permissions for the selected form data should be less than or equal to said authorizer's operation permissions for the selected form data; and SS3: authorizing operation permissions, where the operation permissions of the selected form data are authorized to the selected grantee.

Beneficial Effects of the Invention

Beneficial Effects

The present invention has the following beneficial effects: (1) In the present application, one or more pieces of form data can be independently authorized respectively, for example, the operation permissions of the customer Haier Electronics can be authorized only, which improves the fineness of system management, and is especially applicable to the case where the operation permissions of an important customer's form data or the operation permissions of other important form data need to be set independently, thus helping to protect the enterprise's confidential form data from leakage and satisfying actual use requirements of the enterprise.

The present application directly authorizes form data. The mandatory field in the form of the form data must be filled with a value, which is specific data that has been created, for example, "Haier Electronics". The conventional basic authorization is authorization for a customer form but not for one or more specific customers, while in the present invention, the specific customer such as "Haier Electronics" is authorized.

For example, there are salespersons called Li Si, Wang Wu, and Zhao Liu in a sales department, and a manager of the sales department is Zhang San. After the operation permissions (viewing, modifying, deleting, printing, and exporting) of the form data are authorized by means of a form (customer form) conventionally, the following result is gotten: Li Si is responsible for the customers in the electrical appliance industry and has the operation permission of viewing (one of the customers in the electrical appliance industry is Haier Electronics), Wang Wu is responsible for the customers in the construction industry and has the operation permissions of viewing, modifying, and deleting (one of the customers in the construction industry is Haitian Construction), Zhao Liu is responsible for the customers in the chemical industry and has the operation permission of viewing, and Zhang San is responsible for the customers in the electrical appliance and construction industries and has the operation permissions of viewing, modifying, deleting, and printing. In the conventional method, a grantee either can the view form data of all the customers in an industry, or cannot view the form data of any customer in the industry. It is impossible to independently control the operation permissions of a certain grantee for Haier Electronics or Haitian Construction (a specific piece of form data).

The present application can independently authorize form data respectively. For example, Li Si is authorized to view all customers in the electrical appliance, but is not allowed to view Haier Electronics. For another example, Wang Wu is not allowed to view any customer in the construction industry, but is allowed to view Haitian Construction.

(2) The authorizer in the present application can be system-setting personnel or a department supervisor having certain operation permissions of the form data, or the like. The department supervisor can authorize, according to his operation permissions, a grantee with permissions less than or equal to his operation permissions, which helps the supervisor to control authorization of the form data as required and helps the middle-level leaders of the enterprise to perform management, thus meeting actual use requirements of the enterprise.

For example, considering that the salesperson called Zhao Liu has worked as an administrator in Haier Electronics, which is convenient for sales negotiation, the manager of the sales department called Zhang San wants Zhao Liu to be responsible for this customer. Zhang San needs to authorize the customer Haier Electronics to Zhao Liu. Zhang San only authorizes permissions such as viewing and modifying the form data "Haier Electronics" to Zhao Liu, and none of other employees has these permissions. Zhang San has the permissions to view, modify, delete, and print the customer Haier Electronics, while Zhao Liu does not have any permission for the customer, and Zhao Liu can be selected as a grantee. During authorization, Zhang San's operation permission items "view, modify, delete, and print" for the customer are displayed. Because Zhao Liu does not have any operation permission, none of the displayed "view, modify, delete, and print" is selected. Zhang San can authorize one permission item, or some permission items, or all the permission items of "view, modify, delete, and print" to Zhao Liu.

The manager of the sales department called Zhang San needs to authorize the customer Haier Electronics to Li Si (but does not want Li Si to have any operation permission for the customer because Zhang San has arranged Zhao Liu to be in full charge of the customer), Zhang San has the permissions to view, modify, delete, and print the customer Haier Electronics, while Li Si has the permission to "view" the customer, and Li Si can be selected as a grantee. During authorization, Zhang San's operation permission items "view, modify, delete, and print" for the customer are displayed. Because Li Si has the operation permission to "view" the customer, the item "view" is selected in the displayed "view, modify, delete, and print"; Zhang San modifies "view" selected in the displayed "view, modify, delete, and print" to "not select". After the authorization is saved, Li Si no longer has any permission for the customer Haier Electronics.

In addition, Zhang San cannot control the authorization of customers in the chemical industry, because Zhang San does not have any operation permission for the customers in the chemical industry.

(3) The present application can respectively authorize the permission to view and/or modify the field value of each form field of each piece of the selected form data, which can achieve respective authorization for the operation permissions of form field values, thus further improving the fineness of system management.

For example, a system role is authorized for the selected data "Gree electrical appliance sales order", to allow the system role to view the "order number", "customer name", "customer address", "industry to which the customer belongs", "product model", "product quantity", and "product unit price" of the data "Gree electrical appliance sales order", but now allow the system role to view the content (field values) of sensitive fields "phone number" and "contact person". This method can quickly achieve respective authorization for the field value of each field. For another example, a system role is allowed to view the content of the field "product unit price" of the data "Gree electrical appliance sales order", but is not allowed to modify the content of the field "product unit price". This method can also quickly achieve the authorization of such permissions.

(4) Two or more grantees can be authorized at the same time, thus improving the efficiency of authorizing the operation permissions of the form data. In the authorization process, when one grantee is selected, the current operation permission items of the selected grantee for the selected form data are selected in the authorizer's permission items. When multiple grantees are selected, the current common operation permissions of the selected grantee for the selected form data are selected in the authorizer's permission items, or a list of the form data corresponding to each grantee is listed and the current operation permissions of each grantee for the corresponding form data are selected in the authorizer's permission items, so that the authorizer can authorize the operation permissions of the form data on this basis, thus further improving the authorization efficiency.

(5) In the present application, the role is in one-to-one relation to the user. One role can only be related to a unique user during the same period, and one user is related to one or more roles. The advantage thereof is that the permissions can be gotten as long as the user is related to the role (that is, the user obtains the permissions of its related role), and changes of the role's permissions are much fewer than the changes of the user's permissions in a conventional mechanism. As there are few changes of the quantity of roles having the nature of an independent individual (the nature of a post number/a station number), despite large transfer of employee, few changes occur in the post number/station number (even there is no change within a certain period, that is, the role does not change). This greatly simplifies user's permission management and reduces system overheads.

(6) The operations such as dynamic management, recruitment, and transfer are simple, convenient, efficient and highly reliable. The application of recruitment/resignation/transfer in the permission management is simple. When an employee/a user has changed, it is unnecessary to reset permissions. It is only necessary for a user to cancel the relation or be related to the role. For the user who is no longer in the role, the relation to the role is canceled, and the user who takes over the role is related to the role of the post number. The user related to the role automatically obtains the related tasks and the operation permissions of that role, without re-authorizing the role (the user related to the role also automatically obtains the form operation permissions of the role, and it is also unnecessary to re-authorize the form operation permissions of the role), thus greatly improving the efficiency, security, and reliability of the system setting.

For example, because the user Zhang San is transferred or resigns from a post, Zhang San no longer works as the role of "purchaser 3", and Zhang San then cancels the relation to "purchaser 3". Meanwhile, Li Si takes over the work as the role of "purchaser 3", and it only needs to relate Li Si to the role, so Li Si automatically obtains the operation permissions of form-field values of the role "purchaser 3".

(7) The conventional permission management mechanism defines the nature of a group, a type of work, a class or the like as the role. The role is in a one-to-many relation to the user. In the actual process of using a system, the user's permissions often need to be adjusted during the operation process. For example, in processing the change of an employee's permissions, when the permissions of an employee related to the role have changed, it is improper to change the permissions of the entire role due to the change of the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

However, under the method of the present application, as the role is an independent individual, the object can be achieved by changing the permissions of the role. Although the method in the present application seems to increase the workload during system initialization, by means of copying or the like, the role can be created or authorized more efficiently than the conventional roles having the nature of a group/a class. As it is unnecessary to consider the commonality of the roles having the nature of a group/a class when satisfying the related users, the solutions in the present application make the permission setting clear and explicit. Especially after the system has been used for a period of time (after the permissions of the user/role have changed dynamically), the solutions in the present application can significantly improve the permission management efficiency for the system user in using the system, make the dynamic authorization simpler, more convenient, clearer and more explicit, and improve the efficiency and reliability of the permission setting.

(8) The conventional group/class-based role authorization method is prone to errors. The method provided in the present application significantly reduces the probability of authorization errors, because the method of the present application only needs to consider the role as an independent individual, without considering the commonality of multiple users related to the role having the nature of a group under the conventional method. Even if the authorization errors occur, only the user related to the role is affected. However, in the case of the conventional role having the nature of a group, all users related to the role are affected. Even if the authorization errors occur, the correction method in the present application is simple and takes a short time, while in the case of the conventional role having the nature of a group, the commonality of the permissions of all users related to the role needs to be considered during the error correction. The modification is cumbersome, complex, and error-prone when there are many function points, and in many cases, the problem cannot be solved unless a new role is created.

(9) In the conventional group-based role authorization method, if the role has many permission function points, as time goes by, it is difficult to remember the specific permissions of the role, and it is even more difficult to remember the permission differences between roles with similar permissions. If a new user needs to be related, it cannot be accurately determined how to select a relation. In the method of the present application, the role itself has the nature of a post number/a station number, such that the selection can be made easily.

(10) When a user is transferred from a post, if many permissions of the transferred user need to be assigned to other users, in processing, it is necessary to distinguish the permissions of the transferred user and create roles to relate to other users respectively. The operations are complicated, time-consuming, and prone to errors.

The method in the present application is as follows: The transferred user is related to several roles. When the user is transferred, the relation between the user and the roles in the original department is first canceled (the canceled roles may be re-related to other users), and then the user is related to a role in a new department. The operation is simple and not error-prone.

DETAILED DESCRIPTION

Description of Embodiments

The technical solutions of the present invention will be further described in detail below with reference to the figures, but the protection scope of the present invention is not limited to the following descriptions.

In the present application, the operation permissions are authorized for the form data, which differs from authorization for the form in that: when a form is authorized, it refers to authorizing the operation permissions of the entire form thereof; for example, when a contract form is authorized, the authorization of its operation permissions covers all contracts; moreover, the fields in the form do not have specific field values (that is, when the form is authorized, whether the form has corresponding form data does not affect the operation of authorizing the form; for example, when the contract form is authorized, whether or not the specific contract data/contracts have been created in the system does not affect the operation of authorizing the contract form; alternatively, the contract form can also be authorized without a specific contract).

When form data is authorized, it refers to authorizing the specific piece of data of a certain form. For example, when a Vanke Real Estate sales contract in a contract form is authorized, the authorization of its operation permissions is only limited to this piece of form data. Moreover, the field value of at least one of the fields (including form data ID/number) in the form data is mandatory, that is, at least one field of the form data has the field value.

The conventional form-authorizing mode can achieve authorizing Li Si to view (modify or delete) all customers in the electrical appliance industry (for example, there are 10000 customers in the electrical appliance industry, and one of the customers is Haier Electronics), and authorizing Wang Wu to view (modify or delete) all customers in the construction industry (for example, there are 5000 customers in the construction industry, and one of the customers is Haitian Construction). However, the conventional method of authorizing the operation permissions of form data by means of forms cannot achieve authorizing the operation permissions for Haier Electronics or Haitian Construction only, and has certain limitations during authorization.

Figure 5:
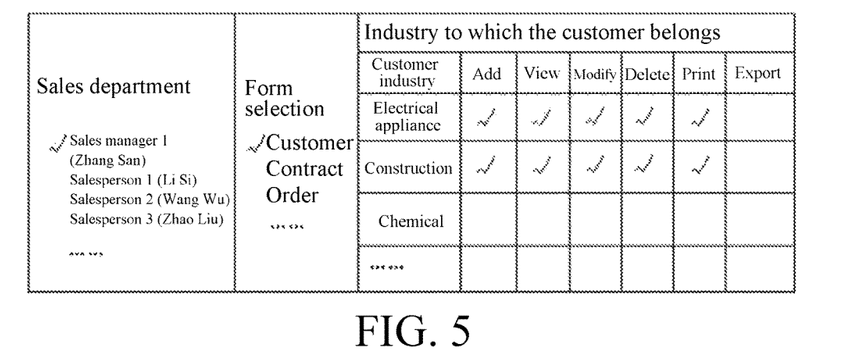
FIG. 5 is a schematic diagram of an existing form-authorizing method for authorizing according to a customer industry.

As shown in FIG. 5, there are salespersons called Li Si, Wang Wu, and Zhao Liu in a sales department, and the manager of the sales department is Zhang San. After the operation permissions (adding, viewing, modifying, deleting, printing, and exporting) of the form data are authorized by means of a form (customer form) conventionally, the following result is gotten: Li Si is responsible for the customers in the electrical appliance industry and has the operation permissions of adding and viewing (one of the customers in the electrical appliance industry is Haier Electronics), Wang Wu is responsible for the customers in the construction industry and has the operation permissions of adding, viewing, modifying, and deleting (one of the customers in the construction industry is Haitian Construction), Zhao Liu is responsible for the customers in the chemical industry and has the operation permissions of adding and viewing, and Zhang San is responsible for the customers in the electrical appliance and construction industries and has the operation permissions of adding, viewing, modifying, deleting, and printing. In the conventional method, the grantee either can view the form data of all the customers in an industry, or cannot view the form data of any customer in the industry. It is impossible to independently control the operation permissions of a certain grantee for Haier Electronics or Haitian Construction (a specific piece of form data).

Embodiment 1

A method for authorizing operation permissions of form data includes a step of selecting form data, a step of selecting a grantee, and a step of authorizing operation permissions, where there is no sequence relation between the step of selecting form data and the step of selecting a grantee; the step of selecting form data: selecting one or more pieces of form data, operation permissions of which need to be authorized; the step of selecting a grantee: selecting one or more grantees to which operation permissions need to be authorized; and the step of authorizing operation permissions: authorizing the operation permissions of the selected form data to the selected grantee.

The method for authorizing operation permissions of form data further includes a step of respectively authorizing a permission to view and/or modify a field value of each form field of each piece of the selected form data.

Figure 6:
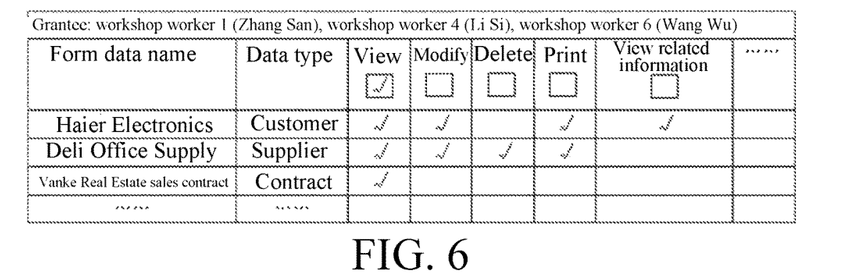
FIG. 6 is a schematic diagram of authorizing form data to multiple grantees according to the present invention.

As shown in FIG. 6, the step of authorizing operation permissions includes the following two authorization modes: (1) authorizing the operation permissions of each piece of the selected form data respectively; and (2) authorizing the operation permissions of all the selected form data as a whole, which can be achieved by checking the operation permission item (in the block in the figure, that is, the column name "view").

The operation permission includes one or a combination of more of a viewing permission, a modifying permission, a deleting permission, a printing permission, and a permission to view related information.

Figure 4:
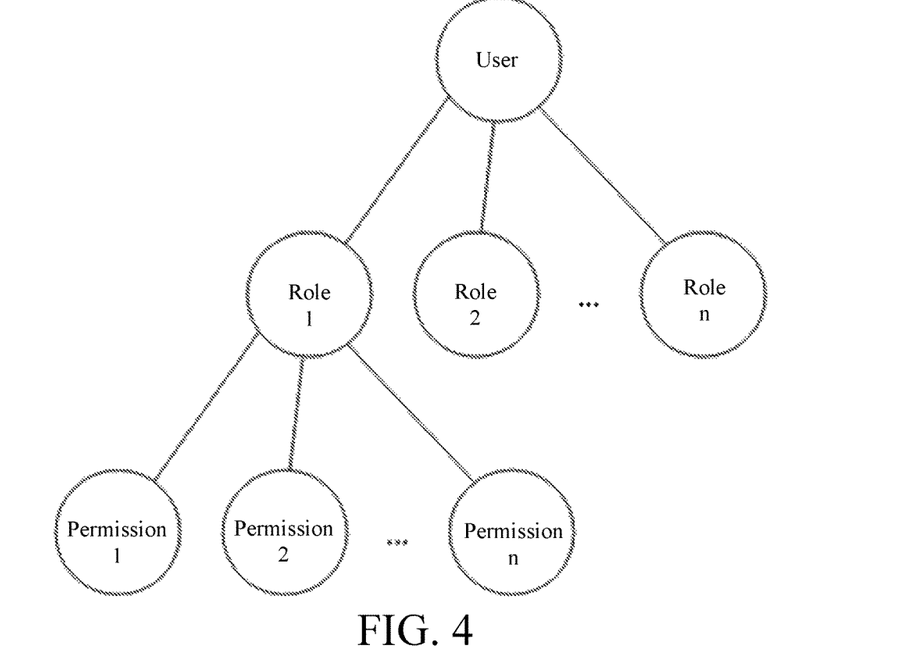
FIG. 4 is a schematic diagram in which a system authorizes a user through a role having the nature of an independent individual according to the present invention.

The grantee includes one type or a combination of more types of a person, a user, a role having the nature of a group/a class, and a role having the nature of an independent individual. In this embodiment, as shown in FIG. 4, preferably, the grantee in the present application is a role having the nature of an independent individual, the role having the nature of an independent individual is different from the role having the nature of a group/a class, one role having the nature of an independent individual can only be related to a unique user during the same period, and one user is related to one or more roles having the nature of an independent individual.

The role having the nature of an independent individual belongs to a certain department, the name of the role is unique under the department, the number of the role is unique in a system, the role is authorized according to the work content of the role, and the user obtains permissions through its related role. During cross-department transfer of the user, the user's relation to the role in the original department is canceled, and the user is related to a role in a new department.

In the following, the advantages of the method for authorizing operation permissions of form data to the user by using a role having the nature of an independent individual are analyzed: The user determines (obtains) permissions through its relation to the role. If the permissions of the user need to be modified, the permissions owned by the role are adjusted to achieve changing the permissions of the user related to the role. Once the user is related to the role, the user owns all the operation permissions of the role.

The role (a role having the nature of an independent individual) is in a one-to-one relation to a user (when the role is related to one user, other users can no longer be related to that role; and if the role is not related to the user, the role can be selected to be related to other users; that is, during the same period, one role can only be related to one user). A user is in a one-to-many relation to roles (one user can be related to multiple roles at the same time).

Definition of a role: A role does not have the nature of a group/a class/a category/a post/a position/a type of work or the like, but has a non-collective nature. The role is unique and is an independent individual. Applied in an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on. The relation between users and roles is as follows: if Zhang San, the company's employee, serves as a deputy general manager 2 of the company and also serves as a manager of Beijing sales department I, the roles to which Zhang San needs to be related are the deputy general manager 2 and the manager of Beijing sales department I, and Zhang San owns the permissions of the two roles.

The concept of conventional roles is a group/a class/a post/a position/a type of work in nature, and one role can correspond to multiple users. However, in the present application, the concept of "role" is equivalent to a post number/a station number, and is also similar to the role in a film and television drama: one role (in childhood, juvenile, middle-age . . . ) can be played by only one actor or actress during the same period, but one actor or actress may play multiple roles.

After the role is created, a user may be related to the role in the process of creating the user, or may be related to the role at any time after the user is created. After the user is related to the role, the user can be released from the relation to the role at any time, and the relation between the user and another role may be created at any time.

The role is composed of: a post name+a post number, for example, a workshop worker 1, a workshop worker 2, a workshop worker 3, and so on. The role is an independent individual, and is equivalent to the concept of a post number or a station number, but different from the role in a conventional permission management system. The concept of the role in the conventional system has the nature of a group/a class such as a post/a position/a type of work or the like.

The following example shows the relationship among an employee, a user, and a role after Zhang San, an employee, enters a company as follows: 1. Recruiting: after the employee is recruited, the role of the corresponding post number/station number is directly selected for the user (employee) to be related. For example, when Zhang San has joined the company (the company has assigned a user Zhang San for Zhang San) and works at the sales department I to be responsible for the sales of refrigerator products in Beijing area (the corresponding role is "sales engineer 5" under the sales department I), then the user Zhang San directly selects and is related to the role "sales engineer 5".

2. Adding position: After Zhang San has worked for a period of time, the company further arranges Zhang San to be responsible for the sales of TV products in Beijing area (the corresponding role is "sales engineer 8" under the sales department I) and to serve as the supervisor of an after-sales department (the corresponding role is "after-sales supervisor 1"). Therefore, two roles, that is, "sales engineer 8" under the sales department I and "after-sales supervisor 1" under the after-sales department, are additionally related to the user Zhang San. In this case, the employee Zhang San is related to three roles: "sales engineer 5" and "sales engineer 8" under the sales department I, and "after-sales supervisor 1" under the after-sales department. Therefore, the user Zhang San owns the permissions of the three roles.

3. Reducing position: After a while, the company has decided to let Zhang San serve as an after-sales department manager (corresponding to a role "after-sales manager" under the after-sales department) without no longer taking up other positions. Therefore, the user Zhang San is related to the role "after-sales manager" under the after-sales department, and is released from the relation to the previous three roles ("sales engineer 5" and "sales engineer 8" under the sales department I, and "after-sales supervisor 1" under the sales department). In this case, the user Zhang San owns only the permissions of the role "after-sales department manager" under the after-sales department.

4. Adjusting permissions of a role (adjusting the permissions of the role itself): if the company has decided to add permissions to the after-sales manager, the permissions only need to be added to the role of the after-sales manager. With the increase of the permissions of the role of the after-sales manager, the permissions of the user Zhang San are also increased.

5. Resignation: After one year, Zhang San resigns. It is only necessary to cancel the relation between the user Zhang San and the role "after-sales department manager" under the after-sales department.

For example, during the dynamic operation of the company, recruiting and resigning of staff often occur continuously, but post numbers/station numbers seldom change (or even remain unchanged within a period of time).

The conventional authorization method: In the case of a large quantity of system function points, authorizing the conventional roles that have the nature of a group/a class involves a large and cumbersome workload and is very error-prone, and errors are not easily detectable in a short time and tend to cause loss to a system user.

The authorization method of the present application: in the present application, the role having the nature of a post number/a station number is authorized, and the user is related to the role to determine (obtain) permissions. Therefore, the permissions of the user are controlled by only a simple user-role relation. Controlling the permissions is simple, easily operable, clear, and explicit, thereby significantly improving the efficiency and reliability of authorization.

Embodiment 2

A method for authorizing operation permissions of form data includes the following sequential steps: S1: selecting form data, where an authorizer selects one or more pieces of form data, operation permissions of which need to be authorized; S2: selecting a grantee, where the authorizer selects one or more grantees to which operation permissions need to be authorized, the grantee's operation permissions for the selected form data should be less than or equal to the authorizer's operation permissions for the selected form data; and S3: authorizing operation permissions, where the operation permissions of the selected form data are authorized to the selected grantee.

Figure 7:
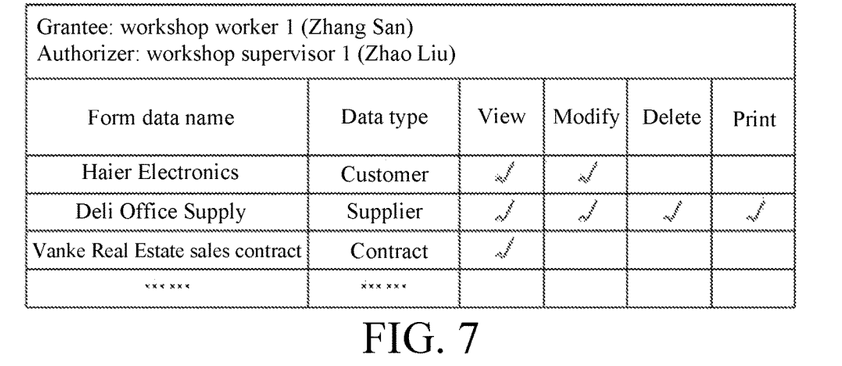
FIG. 7 is a schematic diagram in which a workshop supervisor called Zhao Liu authorizes form data to a single grantee called Zhang San according to the present invention.
Figure 8:
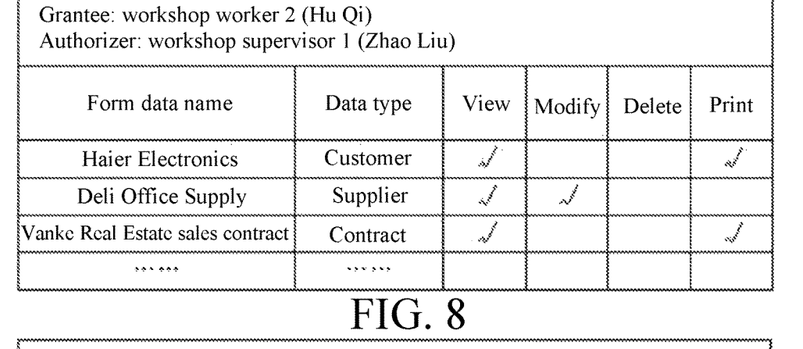
FIG. 8 is a schematic diagram in which a workshop supervisor called Zhao Liu authorizes form data to a single grantee called Hu Qi according to the present invention.

As shown in FIG. 7 and FIG. 8, when one grantee is selected, the authorizer's all operation permission items for the selected form data are displayed, and at the same time, the current operation permission items of the selected grantee for the selected form data are selected from the authorizer's all operation permission items, so that the authorizer can make modifications on this basis conveniently.

Figure 9:
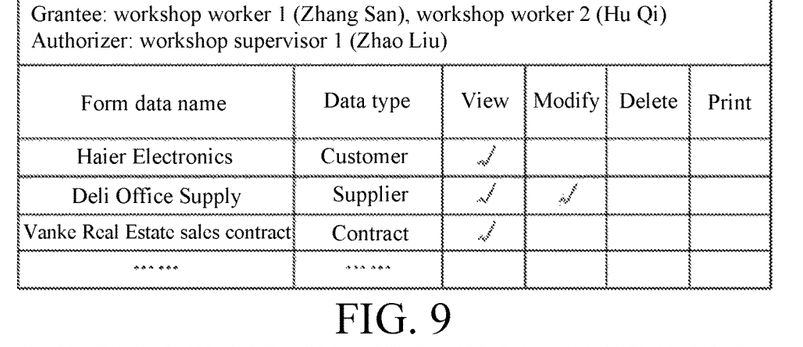
FIG. 9 is a schematic diagram of displaying common operation permissions of Zhang San and Hu Qi during authorization according to the present invention.
Figure 10:
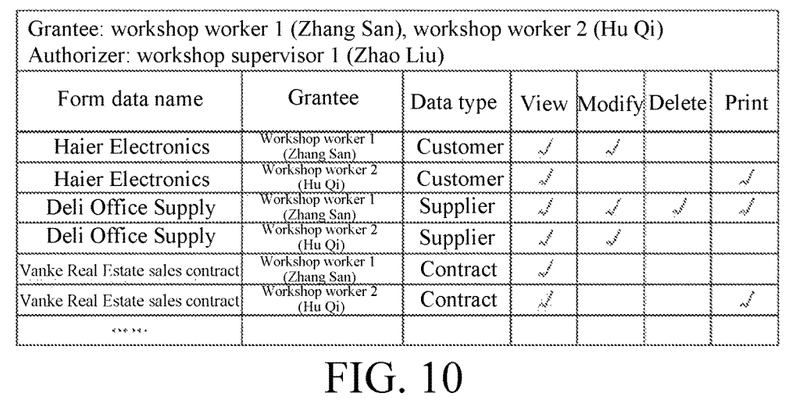
FIG. 10 is a schematic diagram of displaying a list of all form-data-operation permissions of Zhang San and Hu Qi during authorization according to the present invention.

As shown in FIG. 9, when multiple grantees are selected, the authorizer's all operation permission items for the selected form data are displayed, and at the same time, the selected grantees' current common operation permission items for the selected form data are selected from the authorizer's all operation permission items. As shown in FIG. 10, when multiple grantees are selected, a list of the selected form data corresponding to each grantee can also be displayed and the current operation permission items of each grantee for each piece of the selected form data are selected, so that the authorizer authorizes the operation permissions of the form data on this basis, thus further improving the authorization efficiency.

The permission to view and/or modify the field value of each form field of each piece of the selected form data can be authorized respectively. For the same piece of selected form data, the grantee's operation permissions for the field value of each form field of this piece of form data should be less than or equal to the authorizer's operation permissions for the field value of each form field of this piece of form data The authorizer in the present application can be system-setting personnel or a department supervisor having certain operation permissions of the form data, or the like. The department supervisor can authorize, according to his/her operation permissions, the grantee with permissions less than or equal to his/her operation permissions, which helps the supervisor to control the authorization of the form data as required and helps middle-level leaders of the enterprise to perform management, thus meeting actual use requirements of the enterprise.

For example, considering that the salesperson called Zhao Liu has worked as an administrator in Haier Electronics, which is convenient for sales negotiation, the manager of the sales department called Zhang San wants Zhao Liu to be responsible for this customer. Zhang San needs to authorize the customer Haier Electronics to Zhao Liu. Zhang San only authorizes permissions, such as viewing and modifying the form data "Haier Electronics", to Zhao Liu, and none of other employees has these permissions. Zhang San has the permissions to view, modify, delete, and print the customer Haier Electronics, while Zhao Liu does not have any permission for the customer, and Zhao Liu can be selected as a grantee. During authorization, Zhang San's operation permission items "view, modify, delete, and print" for the customer are displayed. Because Zhao Liu does not have any operation permission, none of the displayed "view, modify, delete, and print" is selected. Zhang San can authorize one permission item, or some permission items, or all the permission items of "view, modify, delete, and print" to Zhao Liu.

The manager of the sales department called Zhang San needs to authorize the customer Haier Electronics to Li Si (but does not want Li Si to have any operation permission for the customer because Zhang San has arranged Zhao Liu to be in full charge of the customer), Zhang San has the permissions to view, modify, delete, and print the customer Haier Electronics, while Li Si has the permission to "view" the customer, and Li Si can be selected as a grantee. During authorization, Zhang San's operation permission items "view, modify, delete, and print" for the customer are displayed. Because Li Si has the operation permission to "view" the customer, the item "view" is selected in the displayed "view, modify, delete, and print"; Zhang San modifies "view" selected in the displayed "view, modify, delete, and print" to "not select". After the authorization is saved, Li Si no longer has any permission for the customer Haier Electronics.

In addition, Zhang San cannot control the authorization of customers in the chemical industry, because Zhang San does not have any operation permission for the customers in the chemical industry.

Embodiment 3

A method for authorizing operation permissions of form data includes the following sequential steps: SS1: selecting a grantee, where an authorizer selects one or more grantees to which operation permissions need to be authorized; SS2: selecting form data, where the authorizer selects one or more pieces of form data, operation permissions of which need to be authorized, the grantee's operation permissions for the selected form data should be less than or equal to the authorizer's operation permissions for the selected form data; and SS3: authorizing operation permissions, where the operation permissions of the selected form data are authorized to the selected grantee.

If multiple authorizers authorize the data-operation permissions of the same piece of form data to a grantee A, the grantee A's operation permissions for this piece of form data should be the superposition of the operation permissions assigned by all the authorizers (as long as one authorizer assigns a certain operation permission of the form data to the grantee, the grantee will finally own this operation permission). For example, one authorizer assigns the following operation permissions of a certain piece of form data to the grantee A: modifying/not deleting/printing, and another authorizer assigns the following operation permissions of this piece of form data to the grantee A: not modifying/deleting/not printing. In this case, the grantee A's final operation permissions for the form data is: modifying/deleting/printing.

For another example, Zhang San authorizes the permissions to "view and modify" Haier Electronics to Zhao Liu, and another person authorizes the permissions to "view and print" Haier Electronics. In this case, Zhao Liu owns the permissions to "view, modify, and print" "Haier Electronics".

In this embodiment, the grantee is selected first, and then data is selected: Zhang San has selected the grantees Li Si, Wang Wu, and Zhao Liu. Zhang San may select any one or more customers in the electrical appliance and construction industries (because Zhang San's operation permissions for the customers in the electrical appliance and construction industries are larger than the operation permissions of any one of Li Si, Wang Wu and Zhao Liu). Zhang San may also select other form data, operation permissions of which are larger than or equal to the operation permissions of Li Si, Wang Wu and Zhao Liu (for example, the form data of a contract and an order, where Zhang San at least needs to have the permission to view the form data of the contract and the order).

To ensure the data security, the system may control the operation permission to "authorize data", and the control mode includes: when the operation permissions of a form are authorized, only when the operation permission to "authorize data" of the form is authorized to a grantee, the grantee can authorize the form data having permissions in the form data corresponding to the form for which the grantee has the permission to "authorize data". As in the example above, when the contract form is authorized, the operation permission to "authorize data" of the customer form is authorized to Zhang San, and then Zhang San can authorize the form data (customers in the electrical appliance and construction industries), permissions of which are owned by himself Although Zhang San is the manager of the sales department, he does not have the permissions of the customers in the chemical industry, and therefore cannot authorize the data of the customers in the chemical industry.

The authorization of the form data has higher priority than the authorization of the form: when the form data authorized by means of the form includes the form data authorized in the mode of the present application, this type of data is performed according to the permissions authorized in the present application.

For example, if the customer form is authorized (the viewing and modifying permissions are authorized) to Zhang San in the form authorization mode, after the authorization, the customers authorized to Zhang San include the customer A; the customer A is also authorized (the viewing, modifying and deleting permissions are authorized) to Zhang San in the mode of the present application. In this case, Zhang San's operation permissions for this piece of data, such as the customer A, are performed according to the permissions authorized in the present application. That is, Zhang San can view, modify, and delete the customer A. If the customer form is authorized (the viewing and modifying permissions are authorized) to Zhang San in the form authorization mode, after the authorization, the customers authorized to Zhang San include the customer A; the customer A is also authorized (no permission is authorized, that is, any operation such as viewing or modifying is not allowed according to the authorization) to Zhang San in the mode of the present application. In this case, Zhang San's operation permissions for this piece of data, such as the customer A, are performed according to the permissions authorized in the present application. That is, Zhang San cannot perform any operation, such as viewing or modifying, on the customer A.

Preferably, the authorizer can cancel the authorization in the mode of the present application, and the data related to the canceled authorization is no longer controlled by the authorization mode of the present application: the authorizer can cancel the customer A's authorization in the mode of the present application, and after the authorizer cancelled the current authorization of the customer A to Zhang San in the mode of the present application (that is, the current authorization which has been authorized previously is canceled), Zhang San operates the customer A according to the form-authorization permissions (because the operations on the customer A are no longer controlled by the authorization in the mode of the present application). That is, Zhang San has the permissions to view and modify the customer A.

The above is only a preferred embodiment of the present invention, and it should be understood that the present invention is not limited to the forms disclosed herein, and is not to be construed as being limited to the other embodiments, but may be used in various other combinations, modifications and environments. Modification can be made by the techniques or knowledge of the above teachings or related art within the scope of the teachings herein. All changes and modifications made by those skilled in the art without departing from the spirit and scope of the present invention are intended to be within the protection scope of the appended claims.

What is claimed is:

1. A method for granting one or more operation permissions of form data, comprising:
   selecting one or more pieces of form data;
   selecting one or more grantees to which the one or more operation permissions need to be granted; and
   granting the one or more operation permissions of the selected one or more pieces of form data to the selected one or more grantees;
   wherein there is no sequence between the selection of form data and the one or more grantees; and
   wherein each of said one or more grantees comprises a role, the role is an independent object that is not a group or a class, wherein the role is configured to be related to one user only during a same period, and the user is configured to be related to the one or more roles, and the user is configured to obtain the one or more operation permissions of the related one or more roles.

2. The method for granting one or more operation permissions of form data according to claim 1, further comprises respectively granting a permission to view and/or modify a field value of each form field of each piece of the selected form data.

3. The method for granting one or more operation permissions of form data according to claim 1, wherein the grant of the one or more operation permissions comprises at least one of the following two modes:
  (1) granting the one or more operation permissions for each piece of the selected one or more pieces of form data respectively; and/or
  (2) granting the one or more operation permissions for all the selected one or more pieces of form data as a whole.

4. The method for granting one or more operation permissions of form data according to claim 1, wherein said one or more operation permissions comprise one or more of a viewing permission, a modifying permission, a deleting permission, a printing permission, and a permission to view related information.

5. The method for granting one or more operation permissions of form data according to claim 1, wherein said role is configured to belong to a department, a name of the role being unique under the department, a role number being unique in a system, the role is authorized according to a work content of the role, and the user is configured to obtain the one or more operation permissions through its related one or more roles.

6. A method for granting one or more operation permissions of form data, comprising:
  selecting form data, wherein an authorizer selects one or more pieces of form data;
  selecting one or more grantees by the authorizer to which the one more operation permissions need to be authorized, each of said one or more grantees' operation permissions for the selected one or more pieces of form data are configured to be less than or equal to said authorizer's operation permissions for the selected one or more pieces of form data; and
  authorizing the one or more operation permissions, wherein the one or more operation permissions of the selected form data are granted to the selected one or more grantees;
  wherein each of said one or more grantees comprises a role, the role is an independent object which is not a group or a class, wherein the role is configured to be related to one user only during a same period, and the user is configured to be related to the one or more roles, and the user is configured to obtain the one or more operation permissions of the related one or more roles.

7. The method for granting one or more operation permissions of form data according to claim 6, wherein when one grantee is selected, the authorizer's all operation permissions for the selected form data are displayed, current operation permissions of the selected grantee for the selected form data are selected from the authorizer's all operation permissions; and
  when multiple grantees are selected, the authorizer's all operation permissions for the selected form data are displayed, current common operation permissions of the selected multiple grantees for the selected form data are selected from the authorizer's all operation permissions, or a list of the selected form data corresponding to each grantee is displayed and current operation permissions of each grantee for each piece of the selected form data are selected.

8. A method for granting one or more operation permissions of form data, comprising:
  selecting one or more grantees by an authorizer;
  selecting one or more pieces of form data by the authorizer, operation permissions of which need to be authorized, each of the one or more selected grantees' operation permissions for the selected one or more pieces of form data are configured to be less than or equal to said authorizer's operation permissions for the selected one or more pieces of form data; and
  authorizing operation permissions for the one or more selected grantees, wherein the operation permissions of the selected one or more pieces of form data are granted to the one or more selected grantees;
  Wherein each of said one or more grantees comprises a role, the role is an independent object which is not a group or a class, wherein the role is configured to be related to one user only during a same period, and the user is configured to be related to the one or more roles, and the user is configured to obtain the one or more operation permissions of the related one or more roles.

* * * * *